United States Patent Office
3,631,186
Patented Dec. 28, 1971

3,631,186
17β-DIALKYLAMINOALKYLAMINO - 5α-ANDROSTAN-1-ONES/1α-OLS, N-FORMYL AND Δ² DERIVATIVES THEREOF AND INTERMEDIATES THERETO
Paul D. Klimstra, Northbrook, Ill., assignor to G. D. Searle & Co., Chicago, Ill.
No Drawing. Filed Apr. 27, 1970, Ser. No. 32,388
Int. Cl. C07c *169/20, 169/22*
U.S. Cl. 260—397.3  10 Claims

ABSTRACT OF THE DISCLOSURE

Manufacture of the instant diamines is achieved by condensation of the appropriate 17-keto steroid with a dialkylaminoalkylamine and reduction of the resulting imines. Formylation, suitably with formic anhydride, of those diamines yields the corresponding formamides. These novel diamines and formamides display valuable pharmacological properties, e.g. anti-ulcerogenic, anti-bacterial, anti-fungal and anti-algal.

---

The present invention is concerned with novel steroidal diamines and the corresponding formamides and also with novel intermediates utilized in their manufacture. These diamines and formamides are more particularly defined as 17β-dialkylaminoalkylamino - 5α - androstan-1-ones/1α-ols and the corresponding N-formyl and Δ² derivatives as represented by the following structural formula

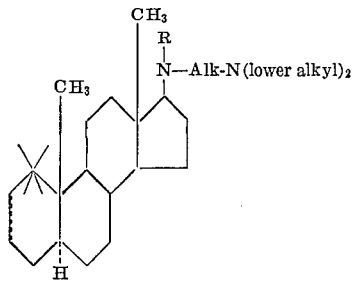

wherein X symbolizes a carbonyl or α-hydroxymethylene group, R can be hydrogen or a formyl radical, Alk denotes a lower alkylene radical and the dotted line represents an optional double bond between carbon atoms 2 and 3.

The lower alkylene radicals denoted by Alk are typified by methylene, ethylene, trimethylene, tetramethylene, pentamethylene and the branched-chain isomers thereof. Representative of the lower alkyl radicals encompassed in the foregoing structural formula are methyl, ethyl, propyl, butyl, pentyl, hexyl, heptyl, and the corresponding branched-chain isomers.

Preferred starting materials for use in the manufacture of the novel compounds of this invention are the 17-keto steroids of the following structural formula

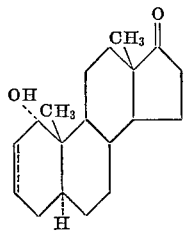

wherein the dotted line indicates an optional double bond linking carbon atoms 2 and 3. In the initial step of the instant process an aforementioned starting material is contacted with a dialkylaminoalkylamine to produce the corresponding imine. Typically, the reaction of 1α-hydroxy-5α-androst-2-en-17-one with 2 - diisopropylaminoethylamine, using an acid catalyst such as p-toluenesulfonic acid, results in 17-[N-(2-diisopropylaminoethyl) imino]-5α-androst-2-en-1α-ol. These novel imines are converted to the corresponding amines by reduction, suitably with a metallic hydride reducing agent such as sodium borohydride, lithium aluminum hydride or lithium tri-(tertiary-butoxy) aluminum hydride or, alternatively, by means of catalytic hydrogenation, preferably using platinum oxide as the catalyst.

The aforementioned 17 - [N-(2 - diisopropylaminoethyl)imino]-5α-androst-2-en-1α-ol, for example, is contacted in methanol with sodium borohydride, thus affording 17β - [N - (2 - diisopropylaminoethyl)amino]-5α-androst-2-en-1α-ol.

An alternate route to the A-ring saturated derivatives of this invention involves catalytic hydrogenation of the corresponding Δ² compounds. A specific example of this process is the hydrogenation of 17β-[N-(2-diisopropylaminoethyl)amino]-5α-androst-2-en-1α-ol, using platinum oxide catalyst, to yield 17β - [N-(2-diisopropylaminoethyl)amino]-5α-androstan-1α-ol.

The formamides of this invention are conveniently derived from the corresponding amines by formylation with a suitable agent such as formic anhydride—conveniently prepared in situ from formic acid and acetic anhydride. That process is exemplified by the reaction of 17β-[N-(2-diisopropylaminoethyl)amino] - 5α-androstan-1α-ol with formic acid and acetic anhydride to yield 17β-[N-(2-diisopropylaminoethyl)formamido]-5α-androstan-1α-ol.

When the instant 1α-hydroxy compounds are contacted with a suitable oxidizing agent, the corresponding 1-keto derivatives are formed. The reaction of 17β-[N-(2-diisopropylaminoethyl)amino] - 5α - androst-2-en-1α-ol with chromic acid, for example, yield 17β-[N-(2-diisopropylaminoethyl)amino]-5α-androst-2-en-1-one.

Equivalent to the amines of this invention are the corresponding acid-addition and quaternary ammonium salts as exemplified by the oxalate, succinate, maleate, tartrate, ascorbate, glycolate, citrate, lactate, nitrate, phosphate, hydochloride, hydrobromide, methochloride, methobromide, methiodide, methosulfate, ethosulfate, etc.

The compounds of the present invention are useful as a result of their valuable pharmacological properties. They exhibit, for example, anti-ulcerogenic and anti-microbial activity. The latter activity is specifically exemplified by the ability of these compounds to inhibit the growth of bacteria such as *Bacillus subtilis* and *Erwinia* sp., fungi such as *Trichophyton mentagrophytes* and *Verticillium albo-atrum* and algae such as *Chlorella vulgaris*.

The anti-ulcerogenic property of the instant compounds is demonstrated by their capacity to inhibit ulcer formation in the Shay rat. Details of that assay are disclosed in U.S. Pat. 3,459,758, issued Aug. 5, 1969.

Evidence for the anti-bacterial activity of the instant compounds is obtained from the following assay:

A mixture of 5 mg. of the test compound with 5 ml. of sterile nutrient broth is heated at 80° C. for 20 minutes, then cooled to about 25° C. and finally serially diluted and mixed with sufficient quantities of a mixture of sterile nutrient broth and 1% of a culture of *Bacillus subtilis* to produce concentrations of approximately 400, 100, 25 and 6 mcg. of compound per ml. The resulting mixtures are incubated for 20–24 hours at 37° C. Controls are provided by concurrent incubations identical with the foregoing excepting that no compound is present. Activity is determined by gross examination and potency is expressed as the minimum concentration in mcg. of compound per ml. at which no growth of the test organism is discernible.

Further evidence for the anti-bacterial activity of the instant compounds is obtained from the following assay:

Nutrient broth (manufactured by Baltimore Biological Laboratories or Difco) is prepared at twice the concentration recommended by the manufacturer, sterilized and inoculated with 2% (by volume) of a culture of Erwinia sp. Meanwhile the test compound is heated in sterile distiled water at a concentration of 2 mg. per ml. and a temperature of 80° C. for a period of 20 minutes. An equivolume mixture of this compound preparation and the inoculated broth is incubated aerobically at 37° C., then examined grossly for growth of the test organism. The incubation period is 24–48 hours. If growth of the test organism is observed, the compound is considered inactive. If no such growth is observed, the incubated mixture is serially diluted and mixed with an inoculated broth of the same composition as before excepting that the concentration is halved and 1% (by volume) of the culture instead of 2% is incorporated. Amounts of the latter broth are added such that the concentrations of 100, 10 and 1 mcg. of the compound per ml. result. The mixtures thus obtained are incubated as before, then examined grossly for growth of the test organism. Potency is expressed as the minimum concentration at which no growth of the test organism is discernible. Controls are provided by concurrent incubations identical with the foregoing except for absence of the test compound.

The anti-fungal properties of these compounds is confirmed by the following assay:

Two concentrations of Sabouraud dextrose agar (manufactured by Baltimore Biological Laboratories or Difco) are prepared, one as recommended by the manufacturer and the other at twice the concentration. These preparations are sterilized and then maintained in a fluid state at 80° C. Meanwhile the test compound is heated in sterile distilled water at a concentration of 2000 mcg. per ml. and a temperature of 80° C. for 20 minutes. An equivolume mixture of this preparation and the double strength agar is serially diluted and mixed with the single strength agar in amounts such that concentrations of 1000, 100, 10 and 1 mcg. of test compound per ml. result. The mixtures thus obtained are allowed to cool and solidify whereupon they are surface inoculated with a suspension of *Trichophyton mentagrophytes* and incubated aerobically at room temperature for 6–7 days. Activity is determined by gross examination and potency is expressed as the minimum concentration at which no growth of the test organism is discernible. Controls are provided by concurrent incubations identical with the foregoing except for absence of the test compound.

The compounds of this invention display anti-fungal activity as determined by the following test procedure:

The test compound is dissolved or suspended in melted Sabouraud agar and is held at 80° C. for 20 minutes. Dilutions are made from this preparation in melted Sabouraud agar in order to yield concentrations of the test substance of 1000, 100, 10 and 1 mcg./ml. in the agar. The agar is permitted to cool and solidify and is then surface inoculated with a suspension of spores of *Verticillium albo-atrum*. The inoculated media are incubated at room temperature for 6–7 days, then are examined grossly for the presence or absence of growth of the test organism. Control preparations lacking the test compound are employed for comparative purposes. The activity of the compound is reported as mcg. of the compound/ml. of agar which completely prevents visible growth of the test organism.

Confirmation of the anti-algal property of the compound of this invention is afforded by their activity in the following assay:

Sterile Bristol medium of two times the normal concentration is inoculated with an aqueous suspension of *Chlorella vulgaris* and 0.5 ml. of that inoculated medium is mixed with 0.5 ml. of a stock solution or suspension of the test compound in sterile distilled water prepared at a concentration of 2 mg./ml. Serial dilutions are made using single strength Bristol medium, thus affording mixtures having concentrations of 1000, 100, 10 and 1 mcg./ml. Those inoculated media are incubated at room temperature under artificial light for 4–5 days, then are examined macroscopically for the presence or absence of growth of the organism. The activity of the test compound is reported as the concentration at which no algal growth is observed. A control mixture identical save for omission of the test compound is prepared for comparison purposes.

The following examples describe compounds illustrative of the present invention and methods which have been devised for the preparation thereof. Throughout these examples temperatures are given in degrees centigrade (° C.) and relative amounts of materials in parts by weight except as otherwise noted.

EXAMPLE 1

A mixture consisting of 12 parts of 1α-hydroxy-5α-androst-2-en-17-one, 7.5 parts of 2-diisopropylethylamine, 1.5 parts of p-toluenesulfonic acid monohydrate and 176 parts of benzene is heated at the reflux temperature for about 16 hours, then is cooled and stripped of solvent by distillation under reduced pressure. The residual solid crude product is purified by recrystallization from ethyl acetate, thus affording 17-[N-(2-diisopropylaminoethyl)-imino]-5α-androst-2-en-1α-ol. This compound is characterized by an optical rotation, in chloroform, of +115.76° and also by the following structural formula

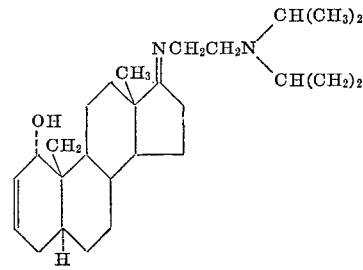

EXAMPLE 2

To a solution of 14 parts of 17-[N-(2-diisopropylaminoethyl)imino]-5α-androst-2-en-1α-ol in 560 parts of methanol is added 8 parts of sodium borohydride with stirring over a period of about 15 minutes. The resulting reaction mixture is stirred at room temperature for about 30 minutes, then is diluted with water and cooled. The resulting precipitate is collected by filtration, washed with water and dried in air to afford the crude product. Recrystallization of that material from acetone results in 17β-[N-(2-diisopropylaminoethyl)-amino]-5α-androst-2-en-1α-ol, which compound displays an optical rotation, in chloroform, of +107.11° and is also characterized by the following structural formula

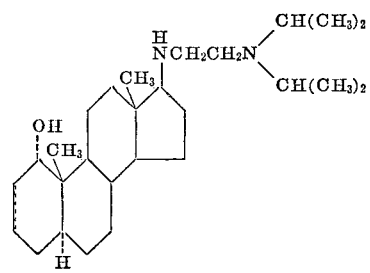

EXAMPLE 3

When an equivalent quantity of 3-dimethylaminopropylamine is substituted in the procedure of Example 1, there is obtained 17-[N-(3-dimethylaminopropyl)imino]-5α-androst-2-en-1α-ol.

EXAMPLE 4

The substitution of an equivalent quantity of 17-[N-(3-dimethylaminopropyl)imino]-5α-androst-2-en-1α-ol in the procedure of Example 2 results in 17β-[N-(3-dimethyaminopropyl)amino]-5α-androst-2-en-1α-ol.

EXAMPLE 5

To a solution of 5 parts of 17β-[N-(2-diisopropylaminoethyl)amino]-5α-androst-2-en-1α-ol in 200 parts of ethanol is added 0.5 part of platinum oxide catalyst and the resulting reaction mixture is shaken at room temperature and atmospheric pressure with hydrogen until 1 molecular equivalent of the gas is absorbed. After completion of the reaction, the solvent is partially removed under reduced pressure and the residual solution is cooled at 0–5° in order to induce crystallization. The crystals which form are collected by filtration and dried in air to yield 17β-[N-(2-diisopropylaminoethyl)amino] - 5α - androstan-1α-ol. This compound displays an optical rotation, in chloroform, of —30.48° and is characterized by the following structural formula

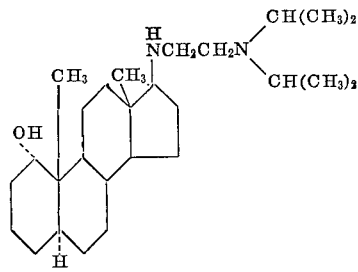

EXAMPLE 6

By substituting an equivalent quantity of 17β-[N-(3-dimethylaminopropyl)amino]-5α-androstan - 1α - ol and otherwise proceeding according to the processes described in Example 5, there is produced 17β-[N-(3-dimethylaminopropyl)amino]-5α-androstan-1α-ol.

EXAMPLE 7

A mixture containing 30 parts of acetic anhydride and 36 parts of formic acid is prepared and added to 2.6 parts of 17β-[N-(2-diisopropylaminoethyl)amino] - 5α - androstant-1α-ol and the resulting reaction mixture is heated on a steam bath for about 2 hours, then is kept at room temperature for about 90 minutes. The reaction mixture is made alkaline by the addition of aqueous sodium hydroxide, during which time methanol is added also. Cooling of the mixture results in formation of needle-like crystals, which are collected by filtration, washed on the filter with water and dried in air to afford 17β-[N-(2-diisopropylaminoethyl)formamido]-5α-androstan-1α-ol. It possesses an optical rotation, in chloroform, of +4.64° and is characterized further by the following structural formula

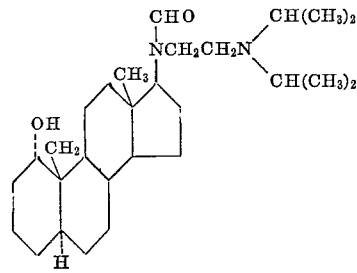

EXAMPLE 8

When an equivalent quantity of 17β-[N-(3-dimethylaminopropyl)amino]-5α-androstan-1α-ol is substituted in the procedure of Example 7, there is produced 17β-[N-(3 - dimethylaminopropyl)formamido] - 5α - androstan-1α-ol.

EXAMPLE 9

A mixture containing 30 parts of acetic anhydride and 36 parts of formic acid is prepared and added to 3.5 parts of 17β-[N-(2-diisopropylaminoethyl)amino] - 5α-androst-2-en-1α-ol. That reaction mixture is then warmed on a steam bath for about 2 hours, following which time it is stored at room temperature for about 90 minutes. The mixture is made alkaline by the addition of aqueous sodium hydroxide and methanol is added also to maintain homogeneity. Dilution with water followed by cooling results in precipitation of the crude product, which is collected by filtration, washed with water and dried in air to yield the crude product. Purification of that material by recrystallization from ethyl acetate affords 17β-[N-(2-diisopropylaminoethyl)formamido]-5α-androst-2-en-1α-ol. This compound is characterized by an optical rotation, in chloroform, of +66.8° and is represented by the following structural formula

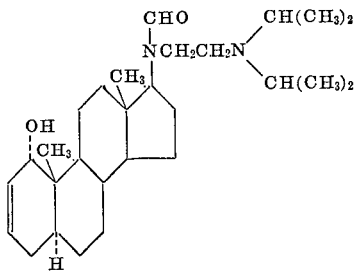

EXAMPLE 10

When an equivalent quantity of 17β-[N-(3-dimethylaminopropyl)amino]-5α-androst-2-en-1α-ol is substituted in the procedure of Example 9, there is produced 17β-[N-(3 - dimethylaminopropyl)formamido]-5α-androst-2-en-1α-ol.

EXAMPLE 11

To a solution of 2 parts of 17β-[N-(2-diisopropylaminoethyl)amino]-5α-androst-2-en-1α-ol in 120 parts of acetone is added an aqueous solution, 8 N in chromium trioxide and 8 N in sulfuric acid, until the orange color of the reagent persists. At that time the excess reagent is destroyed by the addition of isopropyl alcohol and the mixture is diluted with water, resulting in homogeneity. Aqueous sodium carbonate is then added in order to precipitate the crude product, which is collected by filtration, washed on the filter with water and dried in air. That product is further purified by extraction with methanol, dilution of the methanol solution with water and isolation of the crystalline material by filtration, then recrystallization of that substance from aqueous methanol to yield platelet-like crystals of 17β-[N-(2-diisopropylaminoethyl)amino] - 5α - androst-2-en-1-one. This material displays an ultraviolet absorption maximum at about 223.5 millimicrons with a molecular extinction coefficient of about 8700. It is represented by the following structural formula

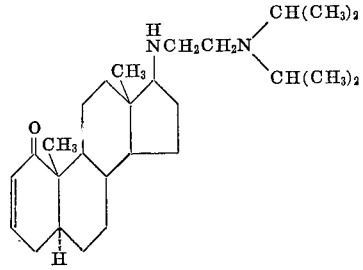

EXAMPLE 12

By substituting an equivalent quantity of 17β-[N-(3-dimethylaminopropyl)amino]-5α-androst-2-en-1α-ol and otherwise proceeding according to the processes described in Example 11, there is obtained 17β-[N-(3-dimethylaminopropyl)amino]-5α-androst-2-en-1-one.

EXAMPLE 13

By substituting an equivalent quantity of 17β-[N-(2-diisopropylaminoethyl)formamido] - 5α - androst-2-en-1α-ol and otherwise proceeding according to the processes of Example 11, there is obtained 17β-[N-(2-diisopropylaminoethyl)formamido]-5α-androst-2-en-1-one.

EXAMPLE 14

The substitution of an equivalent quantity of 17β-[N-(3 - dimethylaminopropyl)formamido]-5α-androst-2-en-1α-ol in the procedure of Example 11 results in 17β-[N-(3 - dimethylaminopropyl)formamido]-5α-androst-2-en-1-one.

What is claimed is:
1. A compound of the formula

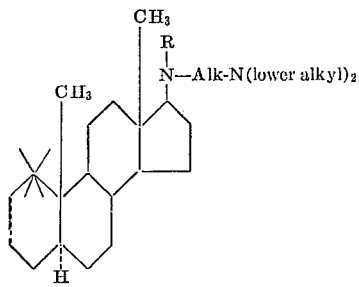

wherein X is selected from the group consisting of carbonyl and α-hydroxymethylene radicals, R is a member of the class consisting of hydrogen and a formyl radical, Alk is a lower alkylene radical and the dotted line signifies an optional double bond linking carbon atoms 2 and 3.

2. As in claim 1, a compound of the formula

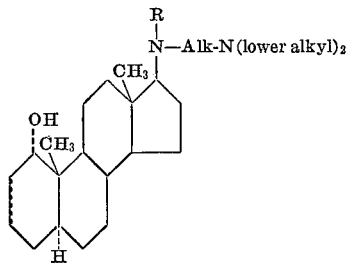

wherein R is a member of the class consisting of hydrogen and a formyl radical, Alk is a lower alkylene radical, and the dotted line denotes an optional double bond linking carbon atoms 2 and 3.

3. As in claim 1, a compound of the formula

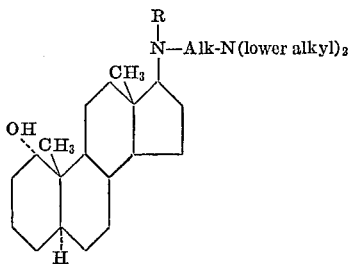

wherein R is a member of the class consisting of hydrogen and a formyl radical and Alk is a lower alkylene radical.

4. As in claim 1, a compound of the formula

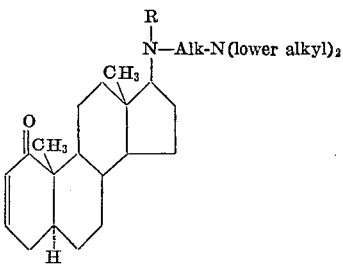

wherein R is selected from the group consisting of hydrogen and a formyl radical and Alk is a lower alkylene radical.

5. As in claim 1, the compound which is 17β-[N-(2-diisopropylaminoethyl)amino] - 5α - androst - 2 - en-1α-ol.

6. As in claim 1, the compound which is 17β-[N-(2-diisopropylaminoethyl)amino]-5α-androstan-1α-ol.

7. As in claim 1, the compound which is 17β-[N-(2-diisopropylaminoethyl)formamido]-5α-androstan-1α-ol.

8. As in claim 1, the compound which is 17β-[N-(2-diisopropylaminoethyl)amino] - 5α - androst - 2 - en-1-one.

9. As in claim 1, the compound which is 17β-[N-(2-diisopropylaminoethyl)formamido] - 5α - androst-2-en-1α-ol.

10. 17 - [N - (2 - diisopropylaminoethyl)imino]-5α-androst-2-en-1α-ol.

References Cited

Klimstra, P. et al., Chem. Abstracts, vol. 64, 1966, 17673b.

LEWIS GOTTS, Primary Examiner

E. G. LOVE, Assistant Examiner

U.S. Cl. X.R.

71—67; 260—397.5; 424—238, 242

UNITED STATES PATENT OFFICE
CERTIFICATE OF CORRECTION

Patent No. 3,631,186     Dated December 28, 1971

Inventor(s) Paul D. Klimstra

It is certified that error appears in the above-identified patent and that said Letters Patent are hereby corrected as shown below:

Column 1, first formula

" 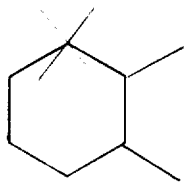 should be " 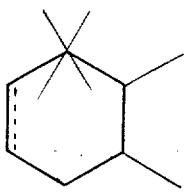 --.

Column 2, line 37, "yield" should be -- yields --.

Column 3, line 21, "meg" should be -- mcg --.

Column 4, first formula

" 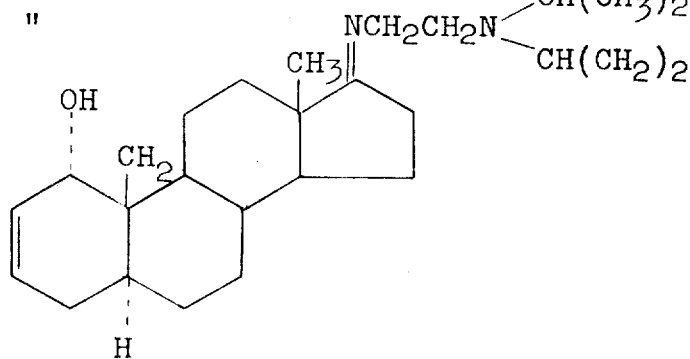 " should be

UNITED STATES PATENT OFFICE
CERTIFICATE OF CORRECTION

Patent No. 3,631,186                    Dated December 28, 1971

Inventor(s)  Paul D. Klimstra

It is certified that error appears in the above-identified patent and that said Letters Patent are hereby corrected as shown below:

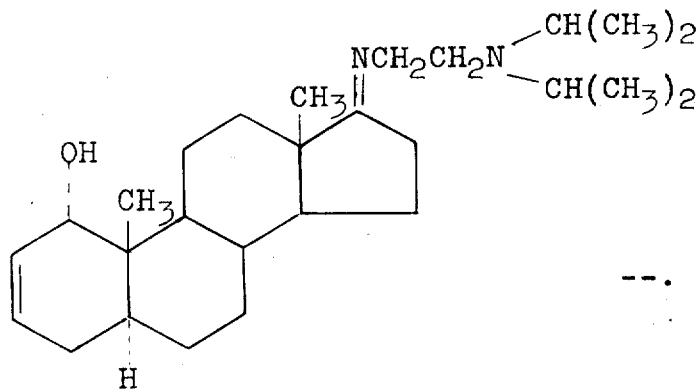

Column 4, second formula

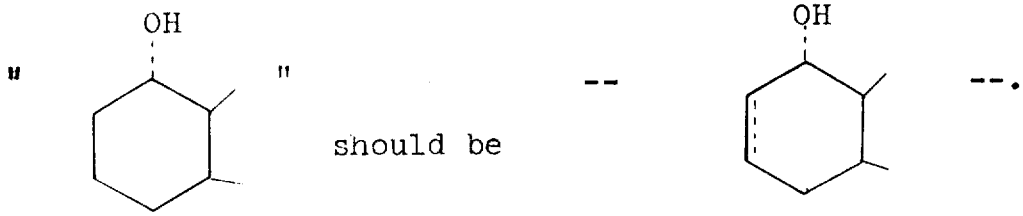

Column 5, line 41, "stant-1α-ol" should be
-- stan-1α-ol --.

UNITED STATES PATENT OFFICE
CERTIFICATE OF CORRECTION

Patent No. 3,631,186         Dated December 28, 1971

Inventor(s)  Paul D. Klimstra

It is certified that error appears in the above-identified patent and that said Letters Patent are hereby corrected as shown below:

Column 5, second formula

" 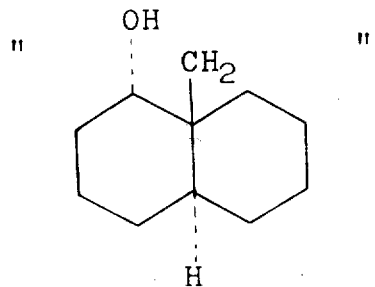 "  should be  -- 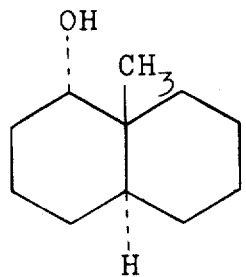 --.

Column 7, first formula

" 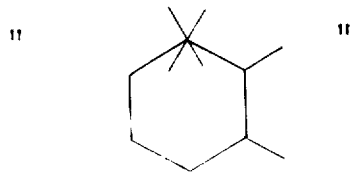 "  should be  -- 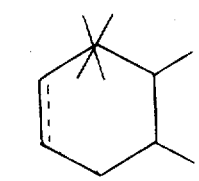 --.

Column 7, second formula

" 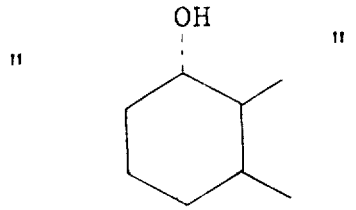 "  should be  -- 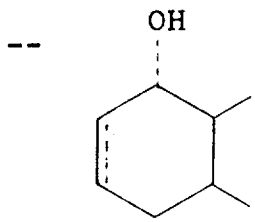 --.

Signed and sealed this 4th day of July 1972.

(SEAL)
Attest:

EDWARD M. FLETCHER, JR.
Attesting Officer

ROBERT GOTTSCHALK
Commissioner of Patents